United States Patent [19]

Akiyoshi et al.

[11] 4,013,895

[45] Mar. 22, 1977

[54] CLAMPING TOOL AND METHOD

[75] Inventors: Toshio Akiyoshi; Hakushi Shibuya, both of Kukuoka, Japan

[73] Assignee: Mitsubishi Denki Kabushiki Kaisha, Tokyo, Japan

[22] Filed: Aug. 28, 1973

[21] Appl. No.: 392,372

[30] Foreign Application Priority Data

| | | |
|---|---|---|
| Aug. 28, 1972 | Japan | 47-100247[U] |
| Dec. 16, 1972 | Japan | 47-126485 |
| Dec. 23, 1972 | Japan | 48-2904 |

[52] U.S. Cl. .............................. 307/126; 81/57.11; 192/142 R

[51] Int. Cl.[2] ......................................... F16D 17/00

[58] Field of Search ...................... 173/1, 11, 12, 4; 318/455; 192/150, 142 R; 29/446, 559, 526; 81/57.11; 307/126

[56] References Cited

UNITED STATES PATENTS

| | | | |
|---|---|---|---|
| 3,581,383 | 6/1971 | Tadahira et al. | 81/57.11 |
| 3,589,489 | 6/1971 | Fehlings | 192/142 R |

*Primary Examiner*—Herman Hohauser

*Attorney, Agent, or Firm*—Sughrue, Rothwell, Mion, Zinn & Macpeak

[57] ABSTRACT

A clamping tool is provided with an electric motor as a driving source of the tool. The condition of the axial force of the clamping means, such as a bolt and nut, on the clamped elements, such as metal sheets is detected by monitoring one of the following quantities of the motor or motor circuit: current, voltage, numbers of rotation, and electric power of said electric motor. When the differential coefficient of the measured quantity reaches approximately zero, after the transient starting conditions have subsided, the motor is stopped. This occurs substantially at the yielding point of the clamping means.

9 Claims, 26 Drawing Figures

CLAMPING TOOL AND METHOD

BACKGROUND OF THE INVENTION

1. Field of the Invention

This invention relates to a method of and an apparatus for clamping a clamping means, such as a bolt or the like, wherein the clamping operation ceases when the axial force of a bolt exerted on members to be clamped reaches a predetermined value.

2. Description of the Prior Art

When clamping bolts in the prior art, it is usually impossible to determine directly the axial force of the bolt. Typically a known torque method is used wherein the torque T proportional to the axial force, applied to rotate a nut is continuously detected. Clamping is effected by aiming at the torque value corresponding to a predetermined axial force N.

The torque method is carried out in accordance with the following equation:

$$N = \frac{1}{k \times d} T,$$

wherein,

*k:* torque coefficient

*d:* effective diameter of bolt

The above method utilizes the proportional relation between the axial force *N* and the torque *T*. However, the torque coefficient value *k* which is one of the proportional constants varies depending on the factors other than the bolt itself, such as temperature, characteristics of the clamping tools, etc., and adhesion of the bolt and nut caused by rust or the like. This introduces errors into the axial force and hinders the predetermined value to be attained.

Another known method for clamping a bolt is a nut-rotation angle method.

This method consists of first clamping the overlapped sheets to be joined thereby setting up a starting state where no slack exists between the sheets. Thereafter the nut is rotated by a predetermined angle utilizing the proportional relation between the nut-rotation-angle and the axial force caused thereby, thus attaining a desired axial force. However, this method has disadvantages in that determination of the status for the initial starting point is extremely difficult and this is directly introduced into the final axial force as errors.

In summary, each of the known methods intends to achieve an axial force of a desired value by controlling only such single quantity as the torque or nut rotation angle. This causes errors depending on the particular situation in the field and fails to obtain the desired clamping state.

SUMMARY OF THE INVENTION

This invention relates to a clamping tool and method which detects the differential coefficient of a physical quantity which varies in accordance with the change of the clamping force caused to a clamping means such as bolt, etc., by the operation of the driving power supply source for the clamping tool and stops said driving power supply when said differential coefficient reaches a desired value.

One object of this invention is to stop the clamping operation when the clamping force produced in the clamping means reaches a proper value.

Another object of this invention is to provide a clamping tool and method capable of stopping said clamping when the clamping force produced in the clamping means reaches the yielding point.

A still further object of this invention is to provide a clamping tool and method which completes said clamping at any point in the range varying after said differential coefficient attains an approximately constant value after the starting.

BRIEF DESCRIPTION OF THE DRAWINGS

FIG. 19 – FIG. 24 show one embodiment of this invention, wherein FIG. 19 is a graph showing the relation between the clamping time of the clamping means and the load current of the motor in using the motor-type clamping tool; FIG. 20 is a circuit diagram; FIG. 21 is a characteristic diagram showing the input and output in a first filter circuit in FIG. 20; FIG. 22 is a circuit diagram showing the first filter circuit; FIG. 23 is a characteristic diagram; and FIG. 24 is a graph showing the differences in the outputs between the first and the second filter circuits.

DESCRIPTION OF PREFERRED EMBODIMENTS

Figure 1:
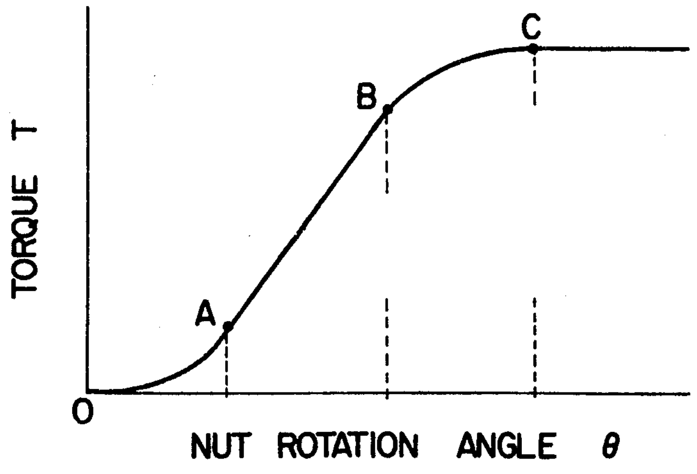
FIG. 1 is a graph showing the relation between the torque and nut rotation angle in clamping a bolt.

In clamping a bolt through overlapped steel sheets, such as in bolt joint work of steel sheets, the relation between the nut rotation angle $\theta$ and the axial force N or the torque T can generally be represented as shown in FIG. 1.

Between points O and A in FIG. 1, the overlapped sheets are not yet sufficiently fitted to each other and most of the nut rotation caused by the clamping action is spent bringing the sheets into close contact with each other. Accordingly, the bolt axial force increases only slowly.

From point A to point B, the clamping effect is produced between the sheets by the rotation of the nut, and a linear relationship exists between the nut rotation angle $\theta$ and the bolt axial force N or torque T.

On further rotation of the nut beyond the point B, the rate of increase of the torque T becomes lower and after reaching the point C, the torque T is not increased by the nut rotation and finally the material will break. The point B is the yield starting point or the proportional limit and, after the point B, the relation between the nut rotation angle $\theta$ and the torque T changes rapidly from the linear relationship existing previously.

A feature of this invention consists in utilizing the change of the state which begins at point B, for the completion of the clamping operation.

Figure 2:
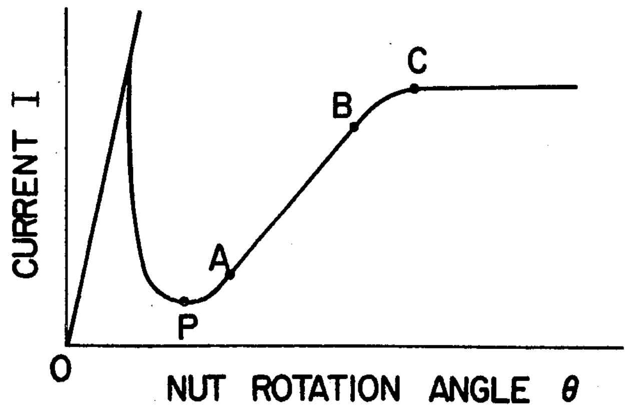
FIG. 2 is a graph showing the relation between motor load current consumed in a bolt clamping tool and nut rotation angle.

For detecting point B, a concept is employed in which the electric power consumed in a bolt clamping tool is detected. FIG. 2 is a graph which represents the relation between the consumed current I in a bolt clamping tool and the nut rotation angle $\theta$, showing that the starting current flows between O and P. Once the starting power is stabilized, the rate of increase in the consumed current increases from P to A, which corresponds to the range between O and A in FIG. 1. The rate is constant between A and B, which corresponds to the range between A and B in FIG. 1, and descreases from B to C, which corresponds to the range between B and C in FIG. 1 showing the change of the state of the bolt. This change of the state occurring at the point where the rate decreases is utilized for stopping the clamping tool. Thus the rate of increase of the torque relative to the nut rotation angle $\theta$ may be determined by detecting the consumed electric power of a clamping tool by an ampere meter.

When the clamping tool is driven by fluid means such as pneumatic pressure or hydraulic pressure, the point B can be detected by utilizing the change in the rate of increase of pressure.

Figure 3:
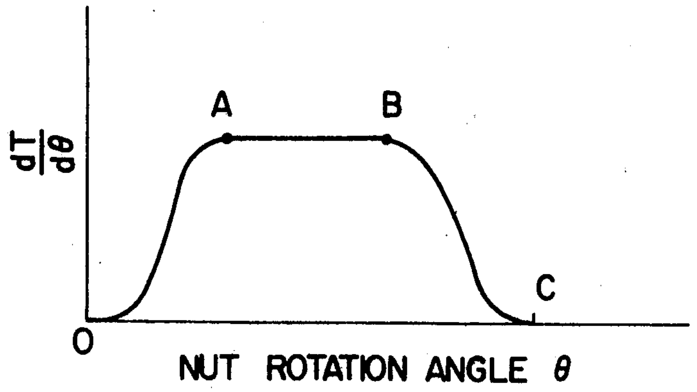
FIG. 3 is a graph showing the relation between the nut rotation angle and differential coefficient of the torque.

The point B is practically detected by instantaneously detecting the nut-rotation angle $\theta$ and the torque T. These two quantities can easily be detected. For example, with the constant nut-rotation angle $\theta$ per unit time, value of the torque T at each instance is detected and the differential coefficient of the torque T versus rotation angle $\theta$, that is $dT/d\theta$ is determined. If the two quantities are in the proportional relation, the differential coefficient $dT/d\theta$ shows a constant value and the point B can be determined as a point at which this proportion is lost (refer to the relation in FIG. 3). This relation can be obtained by taking the nut rotation angle $\theta$ as a standard value and introducing the torque T into a differentiation circuit. This circuit is so arranged that it delivers an output signal at a point where the differential coefficient $dT/d\theta$ begins to decrease or a point where $dT/d\theta$ arrives at a certain level to thereby inform the point B and further stop the driving power for the clamping tool.

Figure 4:
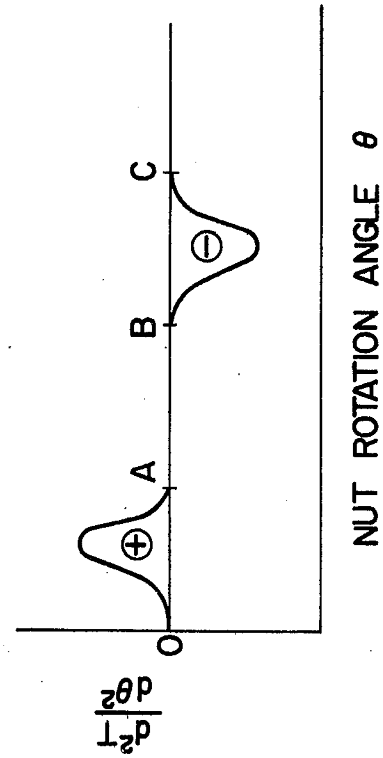
FIG. 4 is a graph showing the relation between the nut rotation angle and second order differential coefficient of the torque.

By introducing said value $dT/d\theta$ once again into a differentiation circuit, the output as shown in FIG. 4 is obtained and this output can be taken out as a negative level from B to C. Therefore, the point B can also be detected by delivering the signal simultaneously with the initiation of the negative level.

It is also possible to add a servo mechanism between the torque T and the nut rotation angle $\theta$ neglecting, viewing from the operation of the circuit, the course O through A, put a B point detector or a detecter circuit to inoperative state during the proportional operation of the servo mechanism from A to B and put these detecter and circuit to operate at a point where the proportional relation is lost. This invention is to be described by way of a preferred embodiment thereof with reference to FIGS. 5 and 6, wherein a motor (M) is a driving power source for a motor-driven type clamping tool. The motor instead of a hydraulic-pressure-type driving source for clamping tool as shown in, e.g., the U.S. Pat. No. 3,581,383.

Trigger switch (SW) for the motor (M) is connected in series with the stator windings (not shown) thereof. A is a current transformer circuit (CT) is connected to the power circuit that transforms a low current, corresponding to the load current of said motor (M), into a voltage to establish the voltage characteristic $f(t)$ shown in FIG. 6. The latter voltage characteristic corresponds to the load current. A sample and hold circuit (F) connected to said current transformer circuit (CT) samples the voltage $f(t)$ at predetermined intervals and holds the sampled valves, designated $g(t)$, until the next sample is taken. A comparison circuit ($b$) is connected to said sample and hold circuit ($F$) and operates to detect a value $f(t)-g(t)$, at each interval of time. The latter value constitutes the differential coefficient of the current. A first relay ($R_1$) is actuated when the detected voltage of said comparison circuit (G) reaches a predetermined value (approximately zero). A normally open contact ($r_1$) of said first relay ($R_1$) is closed only when said first relay operates. A second relay ($R_2$) which consists of a coil (MC) and a normally open contact ($r_2$) is actuated when the current of said motor (M) exceeds a predetermined value (indicated as $A_0$ in FIG. 6). A third relay ($R_3$) is connected in series with the contacts ($r_1$) and ($r_2$) and is provided with normally open contacts ($r'_3$), ($r''_3$) and normally closed contacts ($r_3'''$), said closed contacts being connected in series with the trigger switch (SW). The contact ($r''_3$) is connected in parallel with the contacts ($r_1$), ($r_2$). A set timer (T) for stopping the operation of the motor (M) is connected in series with contact ($r'_3$) and has a knob and an indication dial on the exterior thereof for setting time. A normally closed contact ($t$) of said timer (T) is provided as shown.

Figure 6:
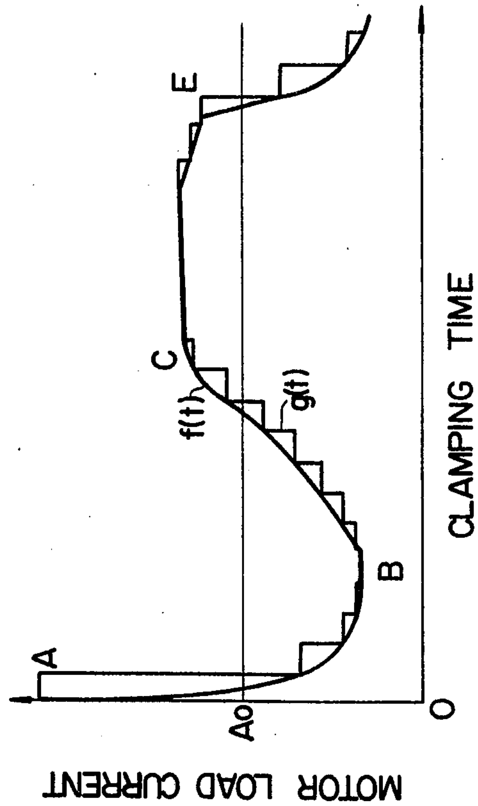
FIG. 6 is a graph showing the relation between the clamping time of the clamping means by way of the motor-type clamping tool depicted in FIG. 1, motor load current and detected current.

It has been experimentally confirmed that the motor current generally provides a curve indicated as $f(t)$ in FIG. 6 when clamping a clamping means, such as a bolt, to clampled members, such as metal sheets. On turning the operation switch (SW) of the motor (M) to ON, the motor (M) is started by the starting current (A) and, thereafter, the current flowing through the motor rapidly decreases to the point B because of the substantial non-loaded condition in which only the frictional resistance in the threaded portion between the bolt and nut constitutes the load on the motor (M). At the point B, which in FIG. 6 constitutes the point at which the clamped members have come into close contact a clamping torque is produced, and on further rotating the motor (M) to thereby clamp the clamped members by way of the bolt and nut, the current through the motor (M) increases rapidly. The rapid increase occurs during the linear relation period of current and rotation angle, as shown between points A and B in FIG. 2 and between points B and C in FIG. 6. The current value reaches C at which the stress caused by the clamping torque of the bolt arrives near the yielding point and, thereafter, keeps substantially balanced condition. When the stress of the bolt exceeds the yielding point, it is elongated by the clamping force and at last broken at the point E. Line AO in FIG. 6 shows the predetermined current value of the motor (M) that is set lower than the starting current (A) and higher than the current value B. It will be apparent that point B in FIG. 6 corresponds to point (P) or (A) in FIG. 2.

Figure 5:
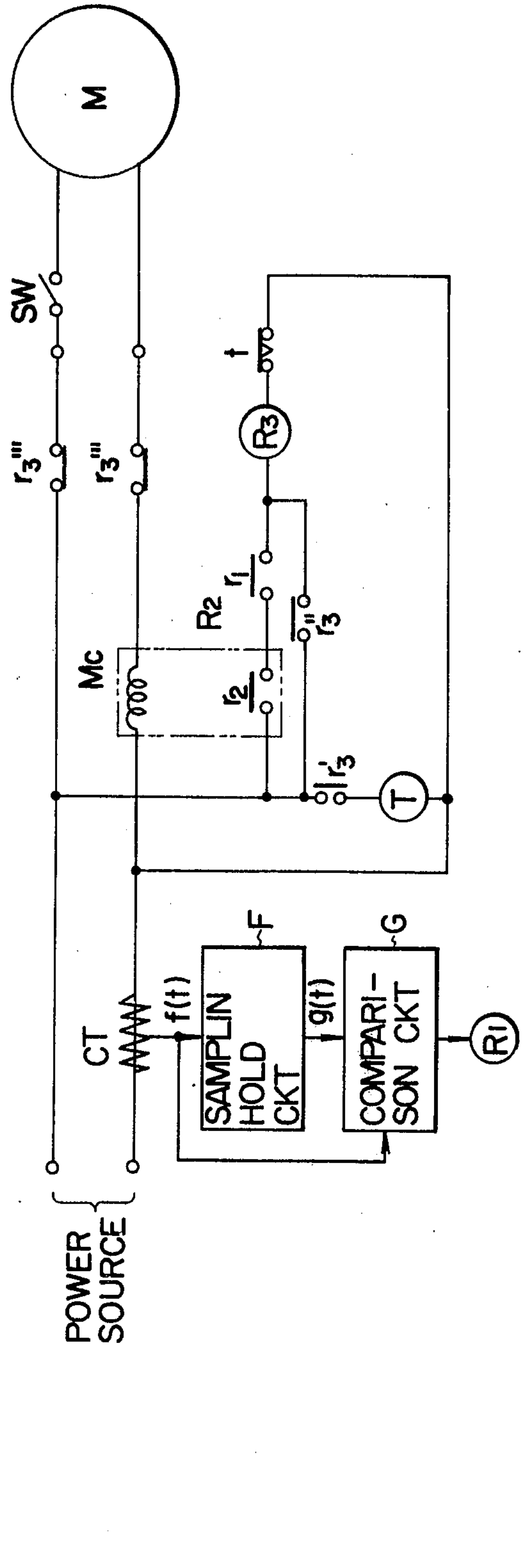
FIG. 5 is a circuit diagram of a motor-type clamping tool of one embodiment of this invention.

The operation of the clamping tool constructed as shown in FIG. 5 is as follows. When the trigger switch is closed, the motor (M) is started by the starting current A. Since the current is initially above the predetermined value AO, the electromagnetic contacter (MC) is actuated to close contact ($r_2$). But as the value of $f(t)-g(t)$ in the comparison circuit (G) is not at the predetermined value, the first relay ($R_1$) is not actuated and its contact ($r_1$) remains open. Therefore, the third relay ($R_3$) is not actuated and its contacts ($r'''_3$) remain closed permitting the motor (M) to continue rotating. The motor current decreases rapidly thereafter, until it reaches approximately point B in FIG. 6, at which point the value $f(t)-g(t)$ in the comparison circuit (G) reaches the predetermined value. At this time the first relay ($R_1$) will be actuated to close its contact ($r_1$), but since the current of the motor (M) is below the predetermined value AO, the electromagnetic contacter (MC) will not be actuated and therefore its contact ($r_2$) will remain open. The third relay ($R_3$) remains in a not actuated state. Thus, the clamping body to which a torque is being applied by the motor clamps the clamped members with increasing force and the current of the motor (M) rapidly increases from point B at which the torque begins to be exerted on the clamping body.

When the current reaches a level corresponding to the vicinity of the yielding point of the clamping body, i.e., near point C in FIG. 6, the value $f(t)-g(t)$ in the comparison circuit (G) arrives at the predetermined value, i.e., when the differential coefficient of voltage $f(t)$ reaches the predetermined value (approximately zero), causing the first relay ($R_1$) to be actuated thereby closing its contact ($r_1$) contact $r_2$will also be closed because the current value is above AO. This energizes relay ($R_3$) to open contacts ($r'''_3$), thereby stopping the rotation of the motor (M). Since this simultaneously deenergizes the electromagnetic contacter (MC), the contact ($r_2$) will open. However since the contacts ($r'_3$) and ($r''_3$) were closed by, the timer relays (T) operate to cause current to flow through the closed circuit consisting of: power source — contact ($r''_3$) — third relay ($R_3$) — contact ($t$) — power source thereby holding the third relay ($R_3$) is an actuated state. Thus, the contacts ($r'''_3$) remain open and the motor (M) will not rotate even if the trigger switch is thrown in. Subsequently, after elapse of a time set into the timer (T), the contact ($t$) will open causing relay ($R_3$) to deenergize thereby permitting contacts ($r'''_3$) to return to their normally closed state. This sets each of the contacts to the positions as shown in FIG. 5 and the clamping work proceeds to the succeeding step.

Depending on the capacity of the motor for the clamping body and the rotation velocity of the clamping, desired adequate clamping can be obtained by operating the first relay ($R_1$) with a certain delay after the detector (G) detects the condition previously described.

It is apparent that this invention is not limited to the embodiment described above and an optimum clamping current may be set instead of providing the sample and hold circuit (F) and the relay ($R_1$) may be actuated in comparison with said optimum value. Alternatively, it may also be arranged in such a manner as detecting the saturation condition of the load current of the motor (M) in another circuit and actuating the relay ($R_1$) thereby.

Figure 7:
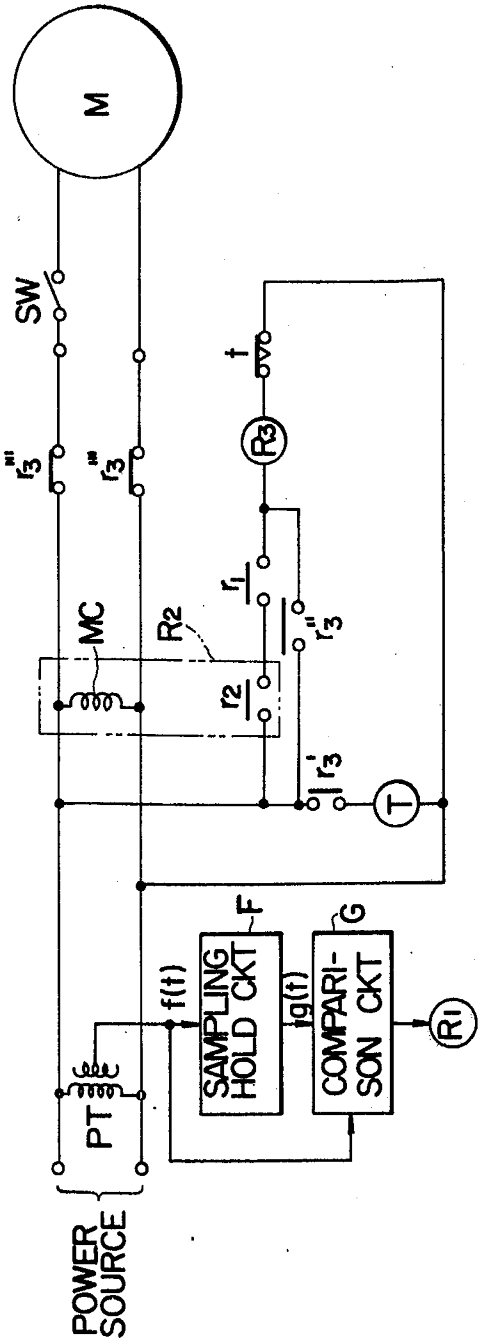
FIG. 7 is a circuit diagram of a motor-type clamping tool of another embodiment of this invention.
Figure 8:
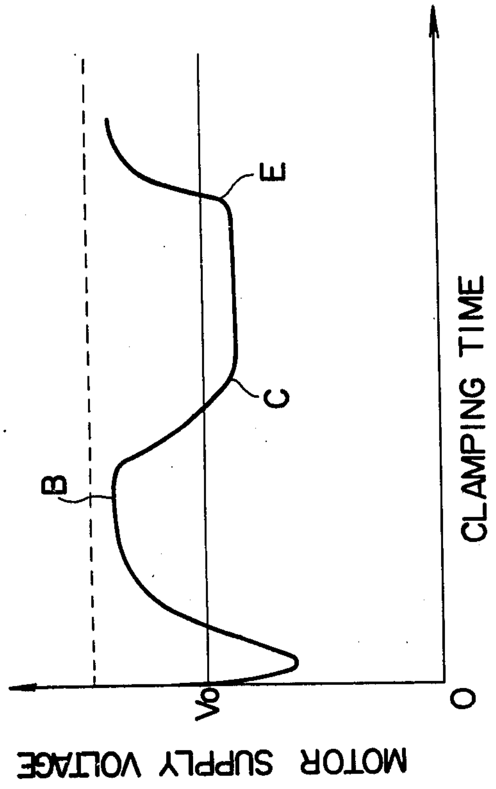
FIG. 8 is a graph showing the relation between the clamping time of the clamping means by way of the motor-type clamping tool and the power supply voltage of the motor.

The changes in the voltage drop across the motor may be utilized as the detectable parameter as shown in FIG. 7, instead of changes in the current as described in the prior embodiment. In FIG. 7, a transformer (PT), having an output corresponding to $f(t)$ as described above, and a predetermined voltage value VO corresponding to AO above, are utilized. The second relay ($R_2$) is not a current relay and is actuated when the voltage drops below a predetermined voltage VO. FIG. 8 shows the voltage drop characteristics. The operation, as will be apparent, is otherwise the same as that of the device of FIG. 7. That is, circuits (F) and (G) cooperate to energize relay ($R_1$) when the differential, i.e., slope, of the voltage curve reaches zero, and relay MC is actuated when the voltage drops below VO. Thus the coincident actuation of (MC) and ($R_1$) occurs at point C, and in response thereto relay ($R_3$) is energized to open contacts ($r_3''$) and disconnect the motor.

Figure 9:
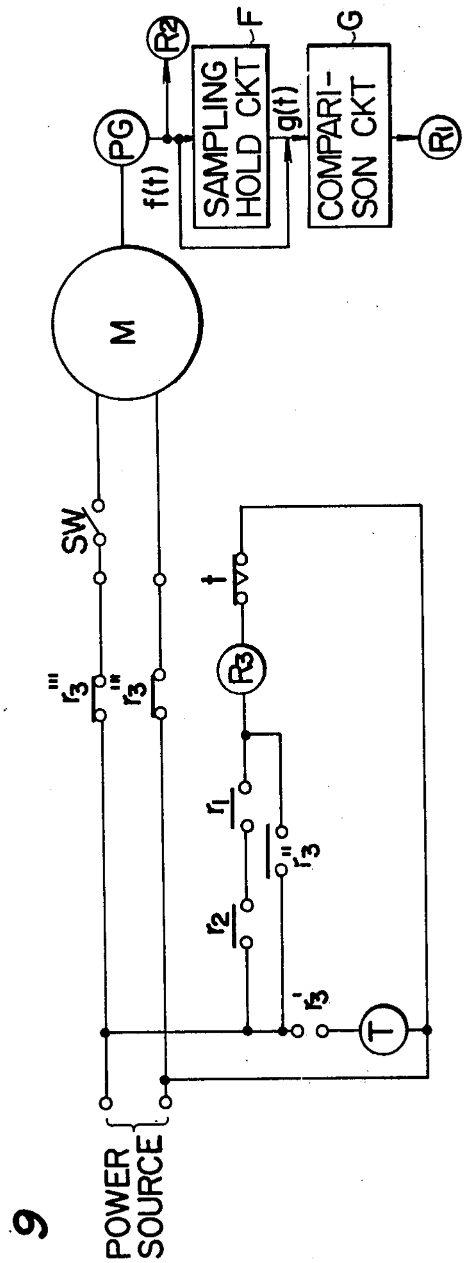
FIG. 9 is a circuit diagram of a motor-type clamping tool of a further embodiment of this invention.
Figure 10:
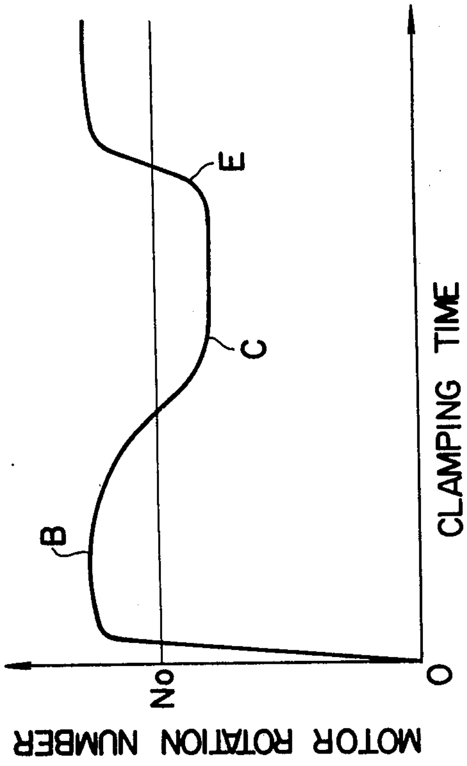
FIG. 10 is a graph showing the relation between the clamping time of the clamping means by way of the motor-type clamping tool shown in FIG. 9 and numbers of motor rotation.

The circuit of FIG. 9 can be used when the number or speed of motor rotations is utilized as the detectable parameter. A pilot generator, (PG) can be employed for the tachometer to generate a voltage proportional to the speed of rotation. FIG. 10 shows the characteristics of rotational speed versus time. In FIG. 9 (RG) is a generator and the second relay ($R_2$) is a voltage relay operating below the predetermined value NO. The circuit otherwise operates in the same manner as that of FIGS. 5 and 7.

Figure 11:
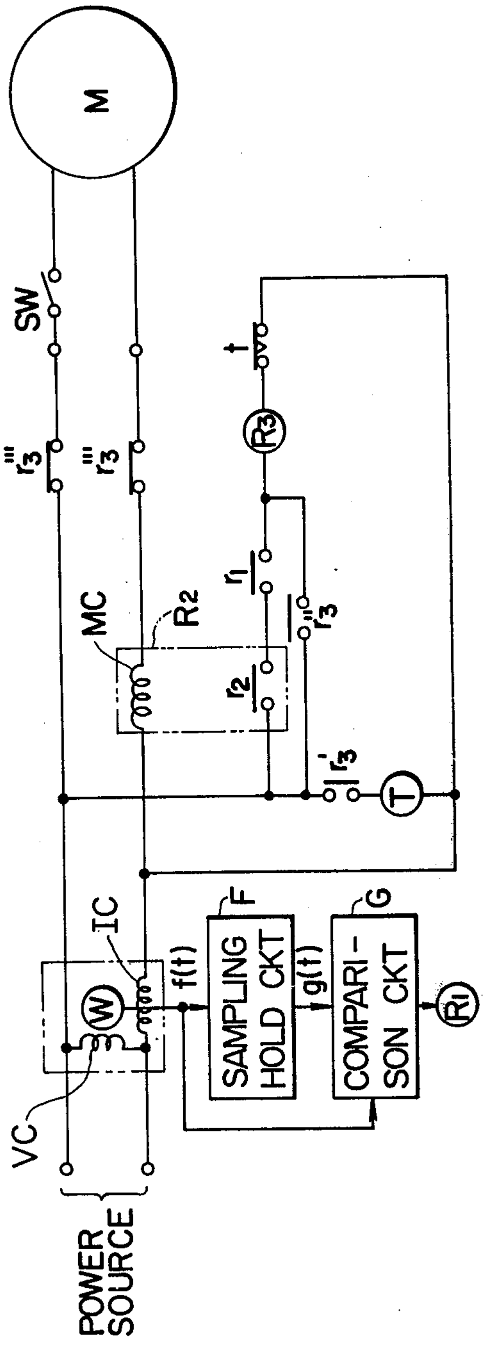
FIG. 11 shows a circuit diagram of a motor-type clamping tool of a still further embodiment of this invention.
Figure 12:
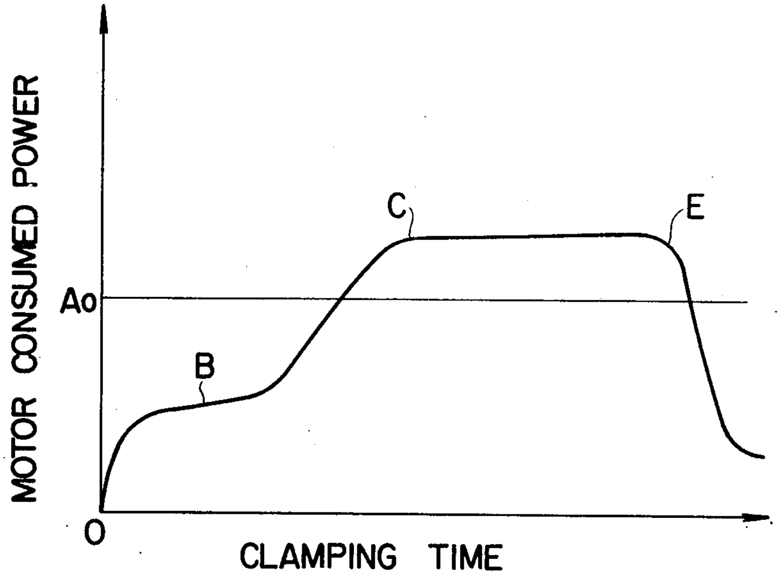
FIG. 12 is a graph showing the relation between the clamping time of the clamping means by way of the motor-type clamping tool and the electrical power consumed in the motor.

The electric power may be detected instead of the numbers of rotation and, in this case, coil rotation torque or the rotation angle may be converted into electrical output and utilized as $f(t)$ in the output of the power meter, that is, power detecter circuit (W). The predetermined value is decided by using a relay similar to said second relay ($R_2$) of FIG. 5 assuming that the power supply voltage is appoximately constant. FIG. 11 shows a circuit diagram thereof wherein VC is a voltage coil and IC is a current coil. FIG. 12 shows the characteristics of the circuit. It will be apparent from the above that the circuits of FIGS. 5, 7, 9 and 11 operate identically, the only difference being the characteristic $f(t)$ used to detect the condition of the clamping means just reaching the yielding point. Thus the characteristic may be current, voltage, rotational speed, or power.

Figure 13A:
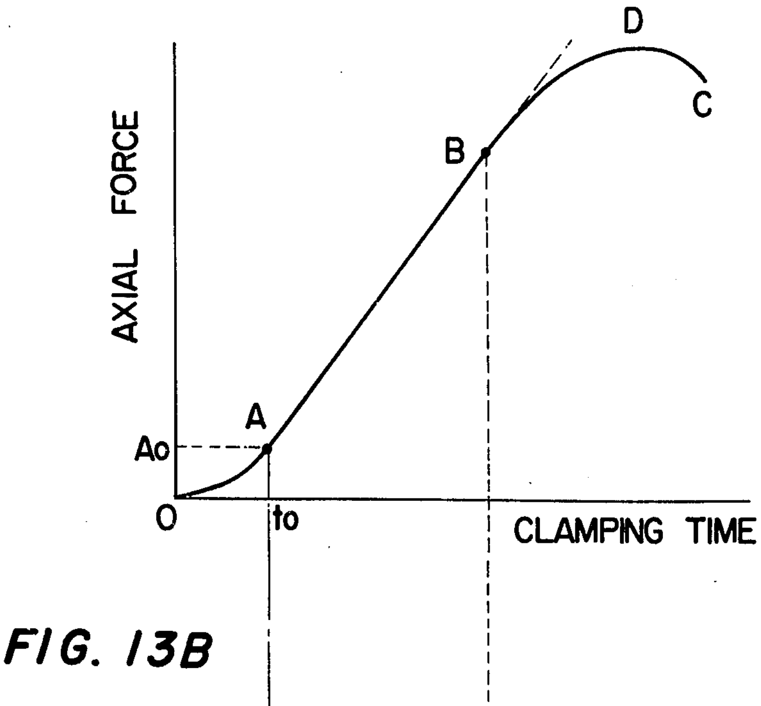
FIG. 13(A) is a graph showing the general relation between the clamping time and bolt axial force in the motor-type clamping tool.

Another embodiment of this invention will be described hereinafter referring to FIG. 13 and FIG. 14. In clamping a bolt (or a nut) by way of a motor-type clamping tool, the temporarily clamping is effected prior to its clamping to prevent the slip at the tip of the bolt. FIG. 13(A) shows the changes in the bolt axial force versus the clamping time. As can be seen from the figure, the differential coefficient of the axial force is not generally constant until the initial clamping point $t_O$(O – A) and thereafter it rises approximately linearly after passing A (A – B). On reaching B, that is, a yielding point of the bolt material, it begins to decrease significantly and the bolt begins to undergo a permanent set from this point. If further clamping is effected after this point, the bolt axial force increases with saturation curve and begins to decrease after passing the maximum point D and the bolt is broken at C. It has been experimentally confirmed that the differential coefficient of the load current versus the clamping time is substantially the same as that of the bolt axial force after A'. Stated otherwise this means that the slope of the load current curve in FIG. 13B is substantially the same as the slope of the axial force curve in FIG. 13A, subsequent to the point A'.

The embodiment described below is constructed in such a way that a motor is automatically stopped at the point B' in FIG. 13, that is, the point corresponding to the yielding point B of the bolt axial force. In FIG. 14, a motor (M) is the driving power source for applying torque to the bolt and nut typically used. A trigger switch (SW) for motor (M) is connected in series with the stator windings (not shown) of said motor (M). A transformer (TR) or the like is connected to the power circuit of said motor (M) and a time limit circuit ($T_1$) connected in series with the transformer (TR) operates in such a manner to energize a relay ($R_1$) and elapsed time after a predetermined voltage is induced in the transformer (TR). A current transformer CT or the like connected to the power circuit of said motor (M) induces voltages therein in proportion to the load current of said motor (M). A control circuit (A) including, for example, a differentiation circuit, ect., is connected in series with said current transformer (CT) and is energized at the point where the differential coefficient (increase) of the load current of said motor (M) begins to decrease significantly. A normally open contact ($r_1$) is connected in series between said control circuit (A) and DC power source (B) and is closed when said first relay ($R_1$) is acutated. A timer or time limit circuit ($T_2$) connected to said control circuit (A) operates while said control circuit (A) is energized or for a certain period after its deenergization. A normally open contact ($t_2$) connected in parallel with said open contact ($r_1$) and control circuit (A) is closed when said timer ($T_2$) operates. A second relay ($B_2$) connected in series with said open contact ($t_2$) is actuated when said open contact ($t_2$) is closed. A normally closed contact ($R_2$) provided in the power supply circuit of the motor(M) is open when said second relay ($R_2$) actuates. The DC power supply (B) mentioned above may be obtained by rectifying AC current from the power source for the motor (M).

Figure 13B:
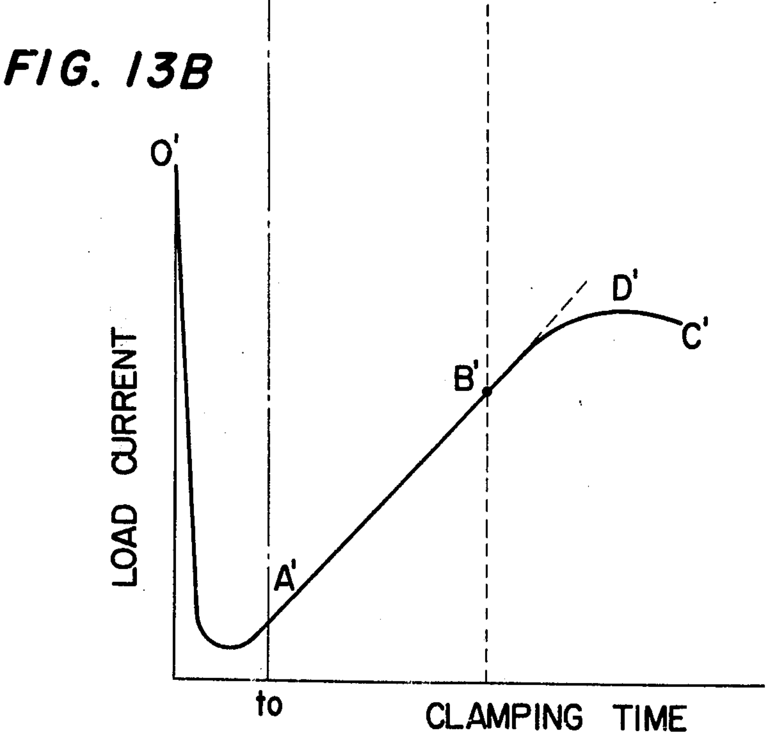
FIG. 13(B) is a graph showing the change of the load current corresponding to FIG. 13(A)

In the circuit thus constructed, when the trigger switch (SW) for the motor (M) is obtained, high starting current O' is supplied to the motor (M) as shown in FIG. 13B, and a voltage is simultaneously induced in the transformer (TR). As a result the time limit circuit ($T_1$) is initiated and operates with a certain delay after the predetermined voltage is induced, i.e., when the current exceeds a predetermined value (for example 1.5 times of non-loaded current) (point A$o$) after the starting current settles. This energizes the first relay ($R_1$) to close its open contact ($r_1$). A voltage corresponding to the load current is also induced then in the current transformer (CT), but the control circuit (A) does not operate while the differential coefficient of the current remains substantially constant. The circuit (A) is energized when the differential coefficient of the current begins to descrease significantly, which occurs after it reaches the point B' corresponding to the yielding point B for the bolt axial force. This completes a series circuit including DC power source (B), contact ($r_1$) and control circuit (A). On this occasion, the timer ($T_2$) operates to close contact ($t_2$) causing the second relay ($R_2$) to operate while the control circuit (A) is energized and for a certain period after the deenergization thereof. Accordingly, the contact ($r_2$) is kept open for a certain period after the current passes the point B' and then is closed. Therefore, the operator may open the trigger switch (SW) within the opening time of the closed contact ($r_2$).

Another embodiment of this invention will now be described referring to FIG. 15 and FIG. 16. FIG. 15(A) shows the differential coefficient of the bolt axial force versus the clamping time just as in FIG. 13(A). FIG. 15(B) shows the motor rotational speed versus the clamping time corresponding to each of the points shown in FIG. 15(A) above. As shown in FIG. 15(A) and also described above, the differential coefficient of the bolt axial force (increase) versus the clamping time can be estimated substantially constant within the elastic limit of the bolt material except for the initial clamping stage (O' $t_O$) but once it reaches the yielding point of the material (B), the differential coefficient of the axial force begins to decrease significantly. The rate of rotation, then falls substantially linearly from points A' to B' during which time the differential coefficient, or slope, is substantially constant. The absolute value of the differential coefficient decreases thereafter as shown in FIG. 15(B). The embodiment of FIG. 16 is so constructed that the motor is automatically stopped at B' of FIG. 15(B) corresponding to the yielding point of the bolt axial force (B). In FIG. 16, a detector (P) for detecting the rate of rotation induces a voltage in proportion thereto. A control circuit (A) connected to said detector (P) and energized at a point where the differential coefficient of the numbers of rotation of the motor (M) begins to decrease significantly. The other elements are not described in detail here since they are the same as those shown in FIG. 14.

Figure 14:
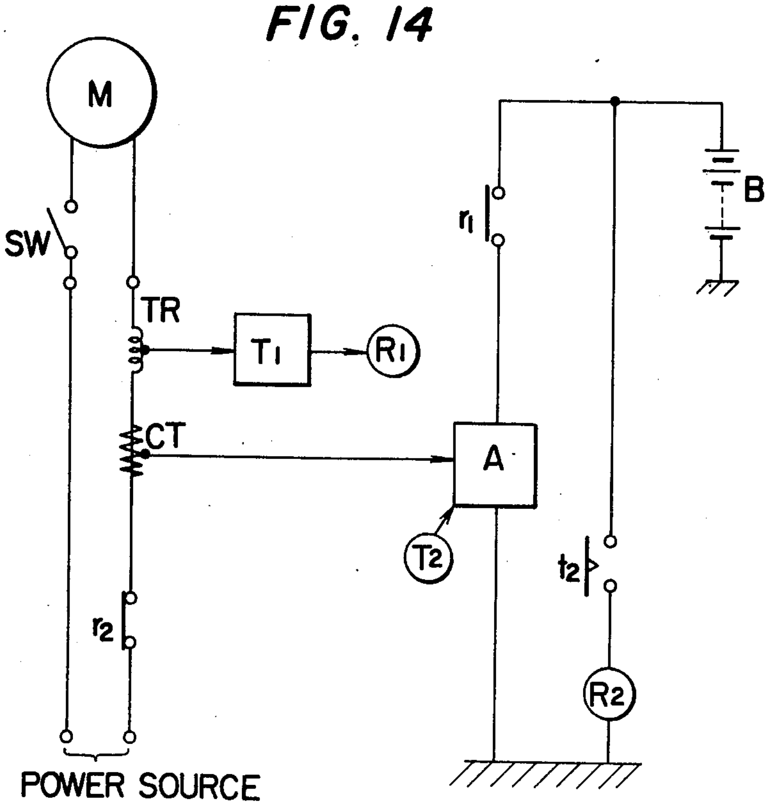
FIG. 14 is a circuit diagram showing one embodiment of this invention.
Figure 15A:
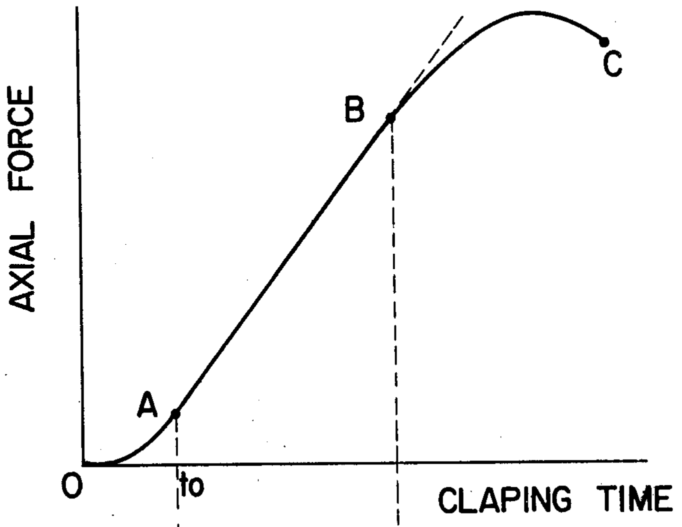
FIG. 15(A) is a graph showing the same relation as in FIG. 13(A)
Figure 15B:
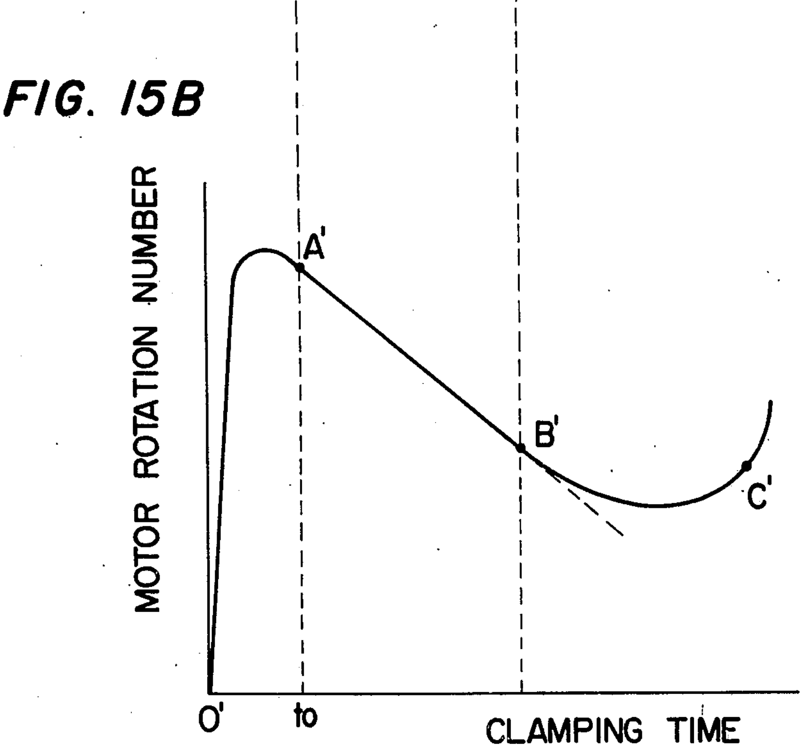
FIG. 15(B) is a graph showing the changes in numbers of motor rotation corresponding to FIG. 15(A)
Figure 16:
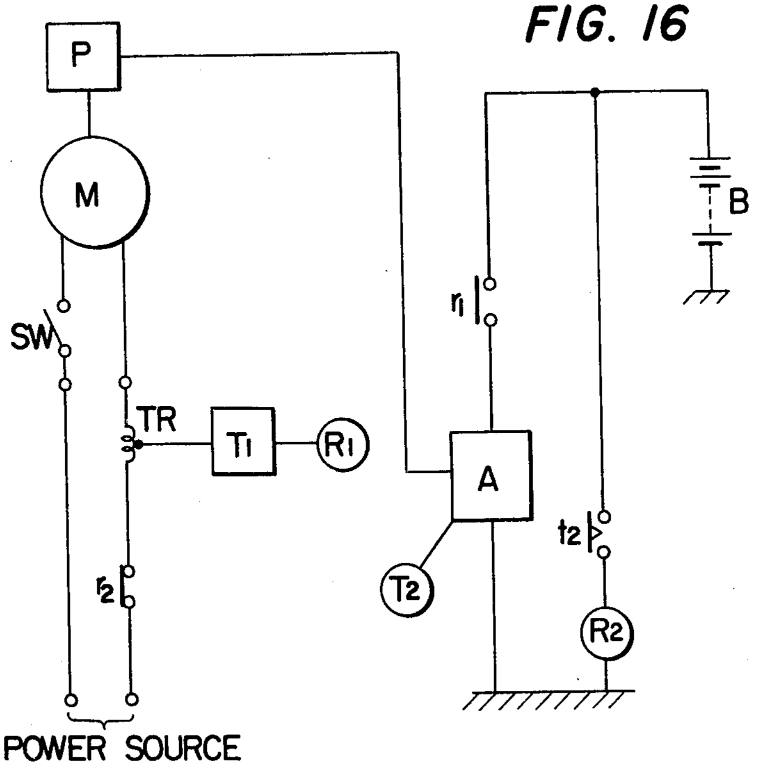
FIG. 16 is a circuit diagram showing another embodiment of this invention.

In the construction above, operations of the transformer (TR), the time limit circuit($T_1$) and the first relay ($R_1$) are the same as those shown in FIG. 14 and the open contact ($r_1$) is closed $t_O$ sec. after the point A in FIG. 15(A) is reached. The voltage induced from the rotation number detector (P) is supplied to the control circuit (A) but the circuit is not energized between points A' and B' in which the differential coefficient is substantially constant. It is energized when the differential coefficient (fall) of the rotation number significantly changes (decrease) to operate the timer ($T_2$) and, thereafter, stop the motor automatically by the similar operations to those described referring to FIG. 14.

According to this invention, as can be understood from the foregoing two embodiments, the motor of the motor-type clamping tool is automatically stopped when the proper axial force is attained for the particular bolt and the re-starting is prevented within a predetermined of period thereby performing the clamping work at a certain axial force.

Figure 17:
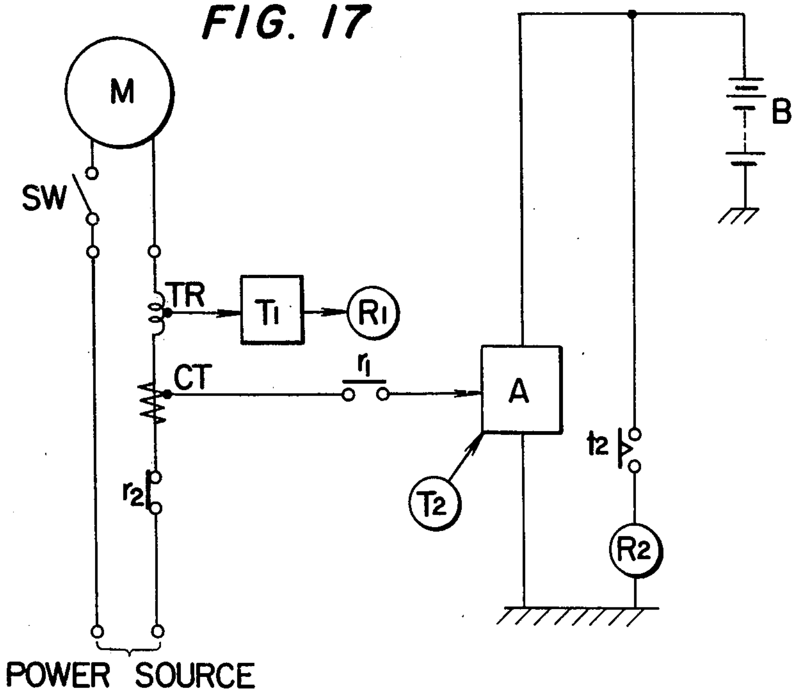
FIG. 17 is a circuit diagram showing a still another embodiment of this invention.

Although in the embodiments above, the open contact ($r_1$) and the control circuit (A) are described as connected in series, similar effects can also be obtained by the construction to be described below. In FIG. 17 showing still another embodiment of the invention, an open contact ($r_1$) of a first relay ($R_1$) is connected in series between a current transformer (CT) and a control circuit (A) while other constructions and the effects thereof being quite the same as those shown in FIG. 14. It is of course possible to connect the open contact ($r_1$) in series between the rotation number detector (P) and the control circuit (A) in FIG. 16.

Figure 18:
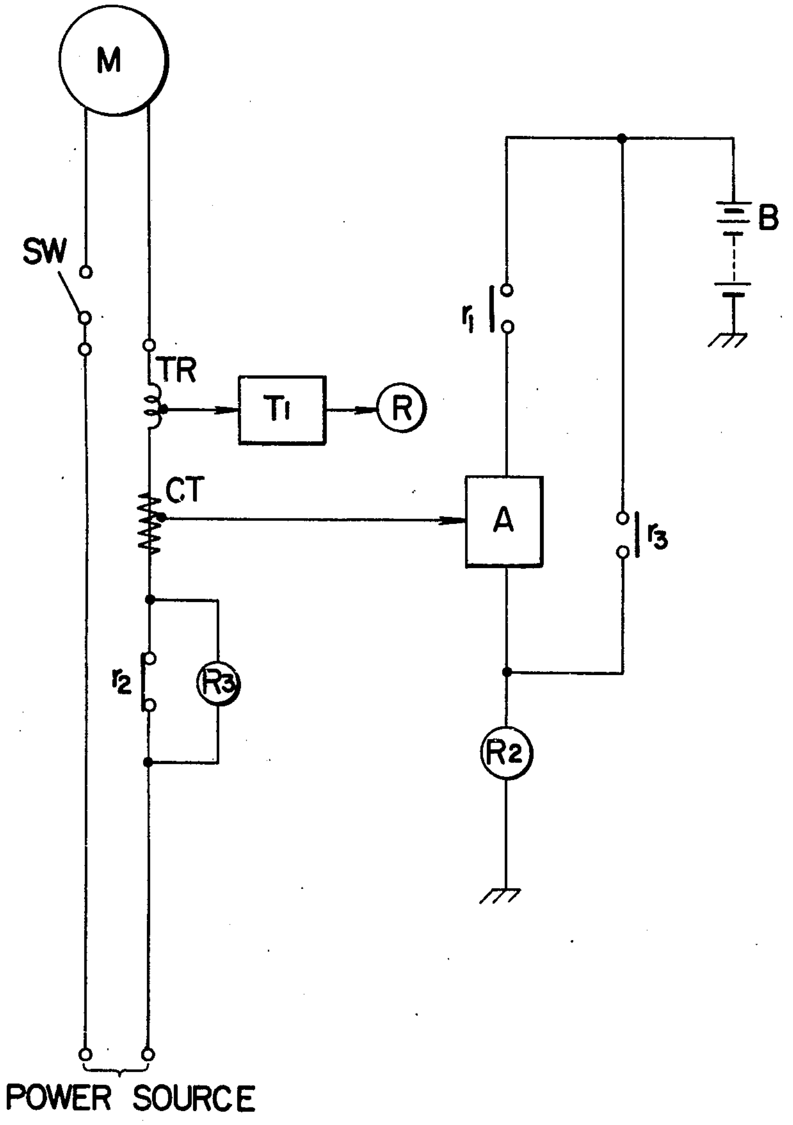
FIG. 18 is a circuit diagram showing a further embodiment of this invention.

In addition, the open state of the contact ($r_2$) is held by the action of the timer ($T_2$) in the embodiments above. However, as seen from FIG. 18, an alternative construction is also possible by connecting a third relay($R_3$) in parallel with a closed contact ($r_2$) and connecting an open contact ($r_3$) of the third relay ($R_3$) in parallel with an open contact ($r_1$), a control circuit (A) and a second relay ($R_2$) so that the third relay ($R_3$) actuates in response to the voltage applied across the closed contact ($r_2$) to close the open contact ($r_3$) thereby holding the second relay ($R_2$) while the switch (SW) is thrown even when the second relay ($R_2$) is energized and the contacts ($r_2$) are open. In this occasion, the impedance of the third relay ($R_3$) is set higher than that of the motor (M) so as to lower the working current of the third relay ($R_3$) thereby preventing the rotation of the motor (M). It will easily be understood that when the switch (SW) is opened, the third relay ($R_3$) is deenergized and the holding state of the second relay ($R_2$) is completed to return the starting condition. It is of course possible in the embodiment shown in FIG. 16, to provide a third relay ($R_3$) and its open contact ($r_1$) and eliminate a timer ($T_2$). An application example in which this invention is applied to the detector of the load current of the motor-type clamping tool is to be described referring to FIG. 19 through FIG. 24.

Figure 19:
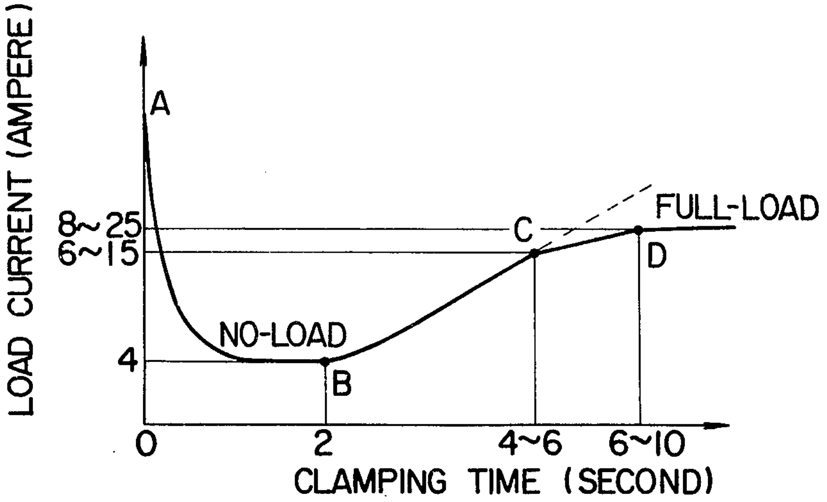

In the motor-type clamping tool which clamps the clamped members by way of a clamping body, such as bolts and nuts, the relation is generally established between the clamping time and the load current as shown in FIG. 19. When the clamping body such as the bolt, etc. is previously threaded into the clamped members and the bolt is fitted with a receptacle that is mounted to the motor-type clamping tool, and then an operation switch for the motor is turned to ON, the motor (M) is started with a high starting current (A). Thereafter, the motor lies in the substantially non-loaded condition in which only the frictional resistance in the threaded portion between the bolt and the clamped members are applied to the motor and the current flowing to the motor (M) rapidly decreases until the point (B) is reached. Then, as the bolt gradually join with the clamped members, the rotation of the motor produces a clamping torque between the bolt and the clamped members. On further rotating the motor to clamp the clamped members with the bolt, the current flowing through the motor rapidly rises to (C) where the stress caused by the clamping torque of the bolt reaches near the yielding point that corresponds to the maximum clamping force of the bolt to the clamped members. On further rotating the motor and clamping the clamped members by the bolt after passing said point (C), the current value arrives at the saturation point (D) and if this state lasts for a certain period, the bolt is elongated by the clamping force and at last broken.

In this example, a circuit is described for detecting the current value (C) just prior to the saturation of the motor current of the bolt clamping torque, but it is of course possible to detect the point for the initiation of the saturation (D) or the intermediate saturation point.

Figure 20:
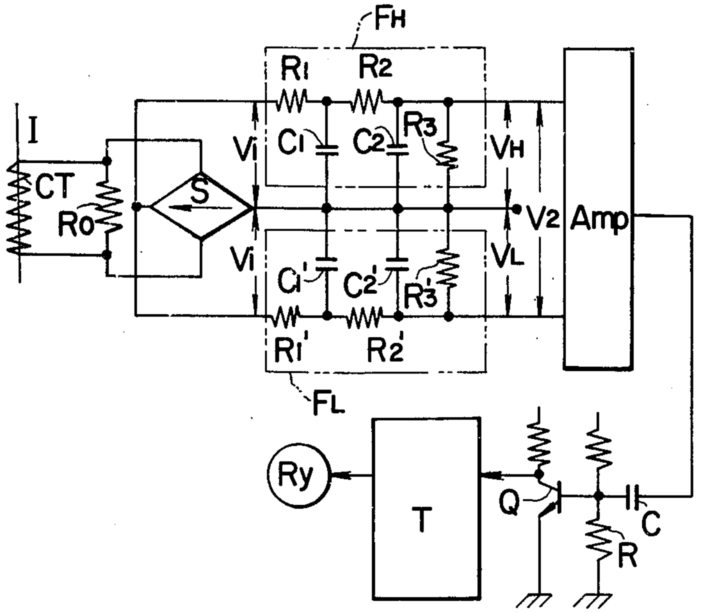

FIG. 20 shows a circuit which comprises a power supply circuit (I) for the motor, a current transformer (CT) connected to said power supply circuit (I), a resistor ($R_O$) connected in parallel with said current transformer (CT) for converting the changes in the current flowing through the power supply circuit (I) into changes in voltage ($Vi$) in cooperation with said current transformer (CT), a full-wave rectifying circuit (S) connected to said current transformer (CT), a first filter circuit (FH) connected to the output of said rectifying circuit (S) and consisting of resistors $R_1$, $R_2$ and $R_3$ and capacitors $C_1$ and $C_2$, and a second filter circuit (FL) connected in parallel with said first filter circuit (FH) and consisting of resistors $R'_1$, $R'_2$, $R'_3$ and capacitors $C'_2$ and having a larger time constant than said first filter circuit (FH). In the figure, VH is an output voltage of the first filter circuit (FH), the VL is an output of the second filter circuit (FL) having opposed polarity to the output voltage VH. The circuit further comprises a differential amplifier Amp which amplifies the minor differences between each of the output voltages VH and VL, capacitor (C) and resistor (R) constituting a differentiation circuit connected in series with the differential amplifier, a transistor (Q) connected in series with said (C) and (R) in the differentiation circuit, a schmidt trigger circuit (T) connected to the collector of said transistor (Q), and a relay ($Ry$) which is connected in series with said circuit (T) and operated when the input to the schmitd circuit arrives at a predetermined value thereby turning the power supply circuit (I) of the motor to OFF and stopping the motor.

In the circuit constructed as above, the operation of the first filter circuit (FH) will be described referring to FIG. 21 and FIG. 22. Assuming in the figures that the voltage becomes constant at the point $V_O$ when the input voltage $Vi$ to the first filter circuit (FH) is applied along the line with a slant corresponding to a constant $K$ from time O to $t_O$, the output voltage of the first filter circuit (FH) provides an asymptote represented by the following equation:

$$VH = K\frac{R_3}{R_1 + R_2 + R_3}t - K',$$

in which $K'$ is a constant determined by the values of resistors $R_1$, $R_2$ and $R_3$ and the capacitors $C_1$ and $C_2$.

The asymptote of the output voltage rises with a predetermined delay decided by the values of the resistors $R_1$, $R_2$ and $R_3$ and capacitors $C_1$ and $C_2$ relative to the input voltage $Vi$. Then, when the time $t_O$ is passed, the output voltage VH provides an asymptote represented by the following equation decided by the values of the resistors $R_1$, $R_2$ and $R_3$ and capacitors $C_1$ and $C_2$:

$$VH + V_0 \frac{R_3}{R_1 + R_2 + R_3} = \text{constant}$$

Figure 21:
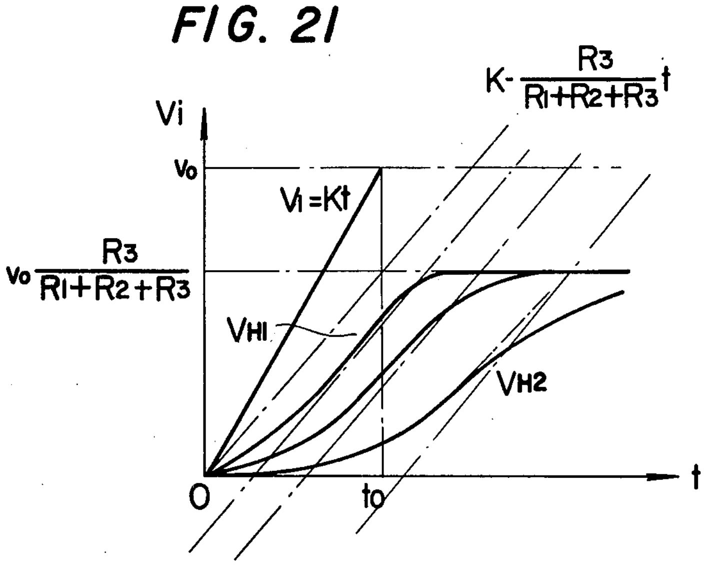
Figure 22:
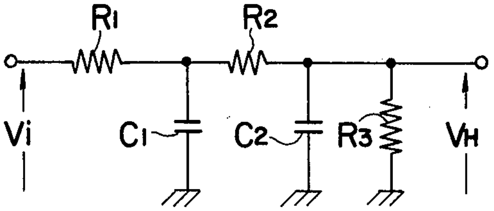

In FIG. 21, $VH_1$ and $VH_2$ represent the change in the state of the asymptote for the output voltage VH due to the differences of the selected values of resistors ($R_1$), ($R_2$) and ($R_3$) and capacitors ($C_1$) and ($C_2$).

Figure 23:
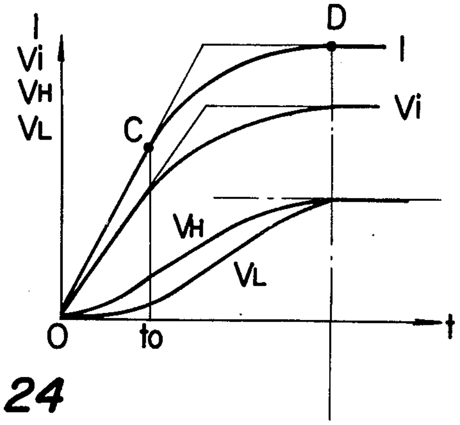

The operation of the second filter circuit (FL) is theoretically the same as that of the first filter circuit (FH) described above and since the description therefor is omitted here (since the time constants of the first and the second filter circuits (FH) and (FL) differ as described above, the second filter circuit having the greater time constant than the first filter circuit, they provide the curves respectively as shown in FIG. 23.).

Figure 24:
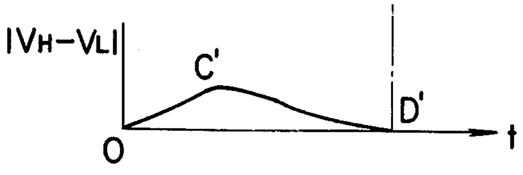

The operation of an embodiment of this invention having the first and the second filter circuits FH and FL described above is to be described in detail. The load current (I) of the motor converted into the changes in voltage V*i* by way of the current transformer (CT) and the resistor ($R_o$) is applied via the recitfier (S) to the first and the second filter circuits (FH) and (FL) as the input voltage V*i*. Then, the output voltage VH and VL from the first and the second filter circuits (FH) and (FL) produce differences between them due to the input voltage V*i* and provide asymptote curves respectively with a certain delay and these curves are saturated and meet where the load current (I) is saturated. Representing the difference between output voltage *VH* and *VL* from the first and the second filter circuits (FH) and (FL) as $V_2$, this can be expressed as:

$$V_2 = |VH - VL|$$

and this $V_2$ is an input to the differential amplifier Amp. The input voltage $V_2$ for the differential amplifier Amp provides a curve as shown in FIG. 24 wherein C' corresponds to C and D' corresponds to D in FIG. 23 respectively. When the input Voltage $V_2$ is amplified by the differential amplifier Amp, $d/dt$ $(VH - VL)$ increases and since C' in FIG. 24 is easily detected by way of (C) and (R) forming the differentiation circuit. The output thus detected is applied by way of the transistor (Q) to the shcmitd circuit (T) and when the applied voltage arrives at a predetermined value, a relay (Ry) is actuated to stop the motor.

This invention is not of course limited only to the motor-type clamping tool and the clamping method but applicable also to clamping tools and clamping methods employing other principles such as hydraulic pressure type and pneumatic pressure type, etc.

While the invention has been described in detail and with reference to specific embodiments thereof, it will be apparent to one skilled in the art that various changes and modifications can be made therein without departing from the spirit and scope thereof.

What is claimed is:

1. In a motor-type clamping tool of the type having a motor as a driving power source for said clamping tool and circuit means for supplying electric power to energize said motor, the improvement characterized by, first means connected to said motor for providing a first electrical signal output in response to the differential coefficient of one of the quantities of motor load current, motor applied voltage, motor applied electrical power, and motor rotational rate reaching a predetermined value, said predetermined value being substantially at zero, second means connected to said motor for providing an electrical switching operation in response to said one quantity reaching a second predetermined value, and third means responsive to the coincident occurrence of said first electrical signal and said electrical switching operation for cutting off the supply of electric power to said motor.

2. A motor-type clamping tool as claimed in claim 1 wherein, said first means comprises a transformer connected to said motor circuit for generating a voltage proportional to said motor load current, sample and hold circuit means for periodically sampling said voltage and holding said sampled voltage during said period, and comparison circuit means responsive to said held voltage and said generated voltage for providing said first electrical signal output when the difference between said held voltage and said generated voltage is substantially at zero, said second means comprises a first relay having a coil connected in said motor circuit and a normally open contact, said relay being responsive to a load current above a predetermined value for closing said normally open contact, and said third means comprises a second relay having a coil responsive to said first electrical signal and a normally open contact which is closed in response to the occurrence of said first electrical signal, said contacts of said first and second relays being connected in series with each other to close a series circuit when both are closed.

3. A motor-type clamping tool as claimed in claim 1 wherein, said first means comprises a transformer connected to said motor circuit for generating a voltage proportional to the voltage applied to said motor, sample and hold circuit means for periodically sampling said voltage and holding said sampled voltage during said period, and comparison circuit means responsive to said held voltage and said generated voltage for providing said first electrical signal output when the difference between said held voltage and said generated voltage is substantially at zero, said second means comprises a first relay having a coil connected in said motor circuit and a normally open contact, said relay being responsive to a load voltage below a predetermined value for closing said normally open contact, and said third means comprises a second relay having a coil responsive to said first electrical signal and a normally open contact which is closed to response to the occurrence of said first electrical signal, said contacts of said first and second relays being connected in series with each other to close a series circuit when both are closed.

4. A motor-type clamping tool as claimed in claim 1 wherein, said first means comprises a means responsive to the rotation of said motor for generating a voltage proportional to said motor rotational rate, sample and hold circuit means for periodically sampling said voltage and holding said sampled voltage during said period, and comparison circuit means responsive to said held voltage and said generated voltage for providing said first electrical signal output when the difference between said held voltage and said generated voltage is substantially at zero, said second means comprises a first relay having a coil responsive to said generated voltage and a normally open contact closed in response to said generated voltage dropping below a level corresponding to a predetermined rotational rate, and said third means comprises a second relay having a coil responsive to said first electrical signal and a normally open contact which is closed in response to the occurrence of said first electrical signal, said contacts of said first and second relays being connected in series with each other to close a series circuit when both are closed.

5. A motor-type clamping tool as claimed in claim 1 wherein, said first means comprises means connected to said motor circuit for generating a voltage proportional to the power applied to said motor, sample and hold circuit means for periodically sampling said voltage and holding said sampled voltage during said period, and comparison circuit means responsive to said held voltage and said generated voltage for providing said first electrical signal output when the difference between said held voltage and said generated voltage is substantially at zero, said second means comprises a first relay having a coil connected in said motor circuit and a normally open contact, said relay being responsive to a load, and said third means comprises a second relay having a coil responsive to said first electrical signal and a normally open contact which is closed in response to the occurence of said first electrical signal, said contacts of said first and second relays being connected in series with each other to close a series circuit when both are closed.

6. A motor-type clamping tool as defined in claim 1, wherein said third means comprises a time limit type timer means for maintaining the cutoff condition of said motor for a predetermined time following initiation of said cutting off.

7. In a motor-type clamping tool comprising a motor as a driving power source for the clamping tool and a motor circuit for energizing said motor, the improvement characterized by, first switching means connected to said motor circuit and operative at a predetermined time after initial application of energy to said motor, a control circuit means connected to said first switching means and operable in response to the operation of said first switching means when one of the quantities consisting of the rate of increase of the motor load current, the rate of increase of the motor electric power, the rate of decrease of the motor rotation rate, and the rate of decrease of the motor voltage reaches a predetermined value which is substantially zero, and second switching means operable in response to the operation of said control circuit means for disconnecting the electrical connection between said motor and said motor circuit.

8. In a motor-type clamping tool comprising a motor as a driving power source for the clamping tool and a motor circuit for energizing said motor, the improvement characterized by, fist switching means connected to said motor circuit and operative at a predetermined time after initial application of energy to said motor, a current transformer connected to said motor circuit, a control circuit means, connected to said first switching means, and to said current transformer, and operable in response to the concurrence of the operation of said first switching means and the sensing by said current transformer that the rate of increase of the load current begins to decrease and second switching means operable in response to the operation of said control circuit means for disconnecting the electrical connection between said motor and said motor circuit.

9. In a motor-type clamping tool of the type comprising a motor as a driving power source for the clamping tool and a motor circuit for applying power to said motor, the improvement characterized by a pair of filter circuits connected in parallel with each other and having different time constants means connected with said motor for generating a voltage proportional to one of the current, voltage, rotation rate and electric power of said motor means for connecting said generated voltage to said pair of filter circuits, and a detector circuit means connected to said filters for detecting the difference between the outputs of both of the filter circuits and for disconnecting the electrical connection between said motor and said motor circuit when said difference reaches a predetermined value.

* * * * *